US006720822B2

United States Patent
Torrisi et al.

(10) Patent No.: US 6,720,822 B2
(45) Date of Patent: Apr. 13, 2004

(54) NEGATIVE CHARGE PUMP ARCHITECTURE WITH SELF-GENERATED BOOSTED PHASES

(75) Inventors: Davide Torrisi, Acireale (IT); Ignazio Martines, Aci Castello (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/998,902

(22) Filed: Oct. 31, 2001

(65) Prior Publication Data

US 2003/0080804 A1 May 1, 2003

(51) Int. Cl.[7] .................................................. G05F 1/10
(52) U.S. Cl. ........................... 327/536; 327/537; 363/59
(58) Field of Search ................................. 327/530, 534, 327/535, 536, 537, 589; 307/110; 363/59, 60

(56) References Cited

U.S. PATENT DOCUMENTS

| | | | | |
|---|---|---|---|---|
| 3,646,425 A | * | 2/1972 | Beck et al. ................. | 327/536 |
| 5,029,282 A | * | 7/1991 | Ito .............................. | 327/536 |
| 5,280,420 A | * | 1/1994 | Rapp ........................... | 363/60 |
| 5,546,031 A | * | 8/1996 | Seesink ....................... | 327/155 |
| 5,889,428 A | * | 3/1999 | Young ......................... | 327/536 |
| 6,100,557 A | * | 8/2000 | Hung et al. ................. | 257/299 |
| 6,130,572 A | * | 10/2000 | Ghilardelli et al. ......... | 327/536 |

* cited by examiner

*Primary Examiner*—Timothy P. Callahan
*Assistant Examiner*—An T. Luu
(74) *Attorney, Agent, or Firm*—Allen, Dyer, Doppelt Milbrath & Gilchrist, P.A.; Lisa K. Jorgenson

(57) ABSTRACT

A negative charge pump circuit includes a cascade connection of a plurality of charge pump stages, each stage including at least a charge capacitance and a pass transistor driven by a corresponding phase signal. An input stage may be coupled to an input reference potential. An output stage may include an output terminal for generating a first pumped voltage. In addition, the charge pump circuit may further include a second output stage connected downstream to the input stage and including a second output terminal for generating a second pumped potential. The architecture may also be implemented in positive charge pump circuits.

24 Claims, 6 Drawing Sheets

NEGATIVE CHARGE PUMP ARCHITECTURE WITH SELF-GENERATED BOOSTED PHASES

FIELD OF THE INVENTION

The present invention relates to electronic circuits and, more particularly, to a charge pump circuit with self-generated boosted phases.

BACKGROUND OF THE INVENTION

As is well known in semiconductor integrated non-volatile memory devices, it is often necessary to perform programming operations thus modifying the information content of the memory device. These programming operations may be a writing phase or an erasing phase. Generally, the first writing operation determines a logic "0" in the memory cells of the memory device, while the second erasing operation determines a logic "1".

During the writing and erasing operations a voltage higher than the supply may be required. In many cases, negative voltage values are required and produced by charge pumps. For example, for the erasing phase of a single supply voltage flash memory device, all the driving terminals of the transistors forming the memory arrays, that is, all the terminals of the gate arrays, are driven by a voltage value of about −9 V. A ramp potential is applied on the bulk or substrate terminal of these transistors and at the end of the erasing phase, when the last erasing pulse is generated, a voltage value of 8.75 V will be present.

The technical processes implemented to manufacture flash memory devices of the last generation are triple well processes allowing complete isolation of the semiconductor regions to which different voltage values are applied. The triple well technology allows realizing negative charge pumps by using N-channel MOS transistors.

The electrical schematic of an N-channel MOS transistor obtained by a triple well structure is shown in FIG. 1 as being part of a negative charge pump. As may be noted in FIG. 6, wherein the same transistor is shown in its real implementation, a suitable biasing of the buried N-doped region at the highest available voltage value, for instance the supply voltage value Vdd, allows a perfect isolation between the well region and the substrate. Such an isolation allows biasing the well region to a negative voltage value, thus, avoiding a direct bias between the well region and the substrate, and as a consequence, between the source and drain regions of the pass transistor.

The ideal condition for the well region is obtained by biasing it to the lowest possible voltage value available in the circuit. This causes a high body effect on the transistors performing the charge transfer. This could cause a low charge transfer efficiency between the pump stages at low supply voltage values.

A schematic view of a negative charge pump for semiconductor integrated memory devices having a single power supply and manufactured by a triple well process is shown in FIG. 1. There is also visible an enlarged scale particularly concerning a charge pass transistor. As shown in this FIG. 1, in the first stages of the charge pump the bulk terminals are biased with a voltage value that is available only two stages downstream. The last two stages have the bulk terminals simply connected to the output terminal. This charge pump architecture is a good compromise between the need to avoid a direct biasing on the parasitic diodes between the junctions, and the other need to limit the body effect that is always there.

As an example, with this architecture the voltages available to the terminals of the second stage pass transistor, in the conduction state, are shown in FIG. 2. The transistor shown in FIG. 2 sees a bulk voltage corresponding to the voltage value reached by the voltage two stages downstream, while the gate terminal sees a voltage corresponding to the voltage on the node 1 plus a voltage swing equal to the supply voltage and due to the inverters that work as phase drivers for the A, B, C and D phases. In this example, the charge transfer from the load capacitance toward ground is penalized by an undesired start-up of those transistors since they receive just the single supply voltage Vdd. In this manner the charge transfer from one stage to the other subsequent stage could be difficult when increasing the working frequency which is fixed by the required performance in terms of drive capability and setting time (Trise).

An imperfect charge transfer is immediately transformed into lower pump efficiency, or, in other words, poorer performance parameters as previously mentioned. Poorer performance is mainly noted in low voltage devices, for instance, those working with a supply voltage Vdd=1.8/2.5V.

SUMMARY OF THE INVENTION

An object of the present invention is provide a negative charge pump architecture having structural and functional features allowing a better charge transfer between the pump stages through a better voltage overdrive on the gates of the pass transistors.

A first embodiment of the invention provides a higher voltage swing on the node 1, shown in FIG. 2, for instance, by doubling the voltage overdrive on such a node passing from a common voltage swing corresponding to the supply voltage value to a double voltage swing corresponding to a double supply voltage value, as shown in FIGS. 3A and 3B.

To achieve this object, a negative voltage value Vdd is picked up by the same charge pump changing its architecture. Thus, the invention relates to a negative charge pump architecture comprising: a plurality of circuit stages cascade connected one to the other between an input stage, coupled to an input reference potential, and an output stage including an output terminal producing a pumped potential. The architecture further includes a corresponding plurality of a pass transistors, one for each stage, each driven by a corresponding phase signal through a decoupling capacitor, and a corresponding plurality of charge capacitances, one for each stage. In addition, the negative charge pump architecture may include a further output stage connected downstream of the input stage and including a further output terminal producing a further raised or pumped potential.

BRIEF DESCRIPTION OF THE DRAWINGS

The features and advantages of the charge pump architecture according to the invention will be apparent from the following detailed description of embodiments thereof, given as non-limiting examples with reference to the accompanying drawings, in which.

DETAILED DESCRIPTION OF THE PREFERRED EMBODIMENTS

Figure 4:
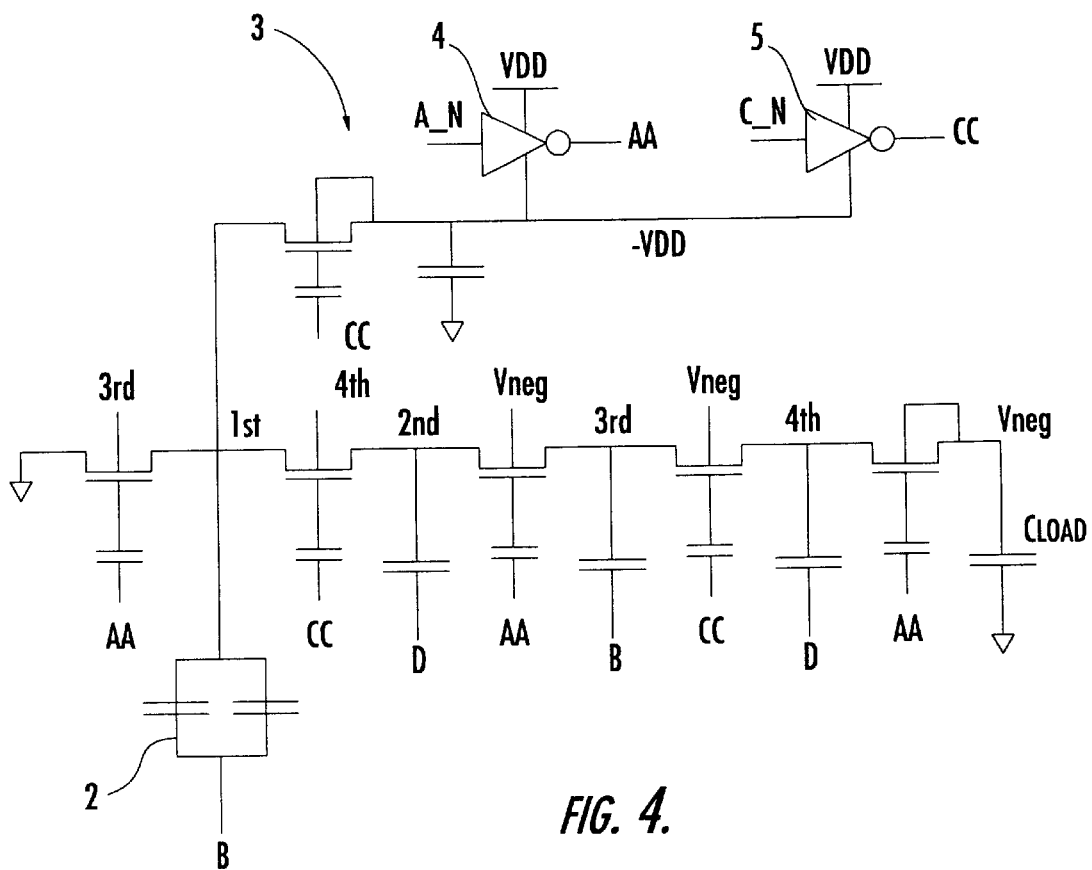
FIG. 4 is a schematic diagram of a negative charge pump architecture according to the present invention.
Figure 5:
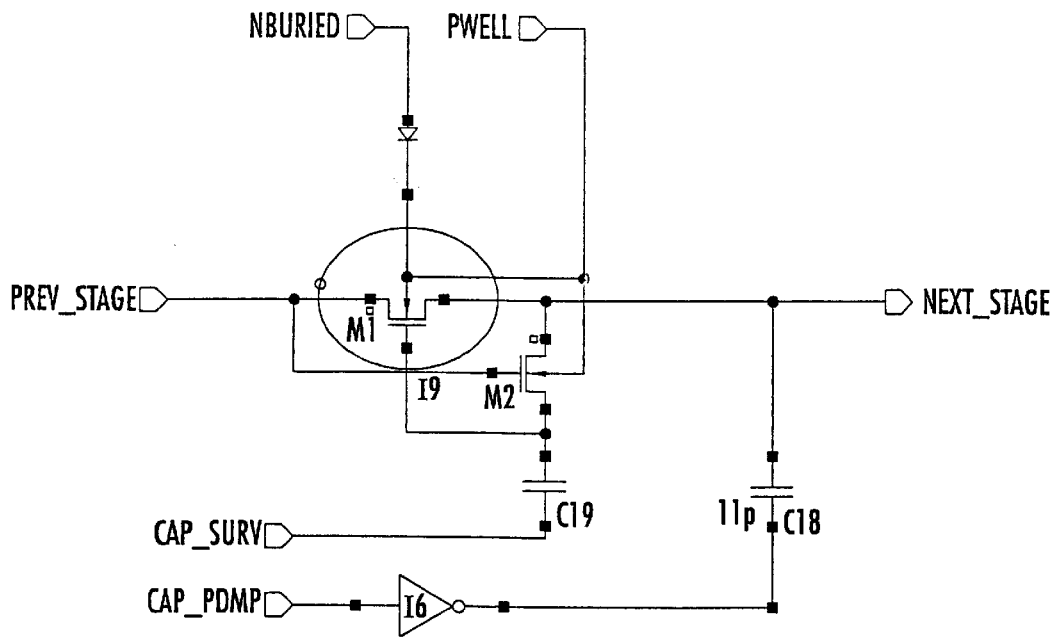
FIG. 5 is a schematic diagram of a possible circuit implementation of a stage of the negative charge pump architecture of FIG. 4.
Figure 6:
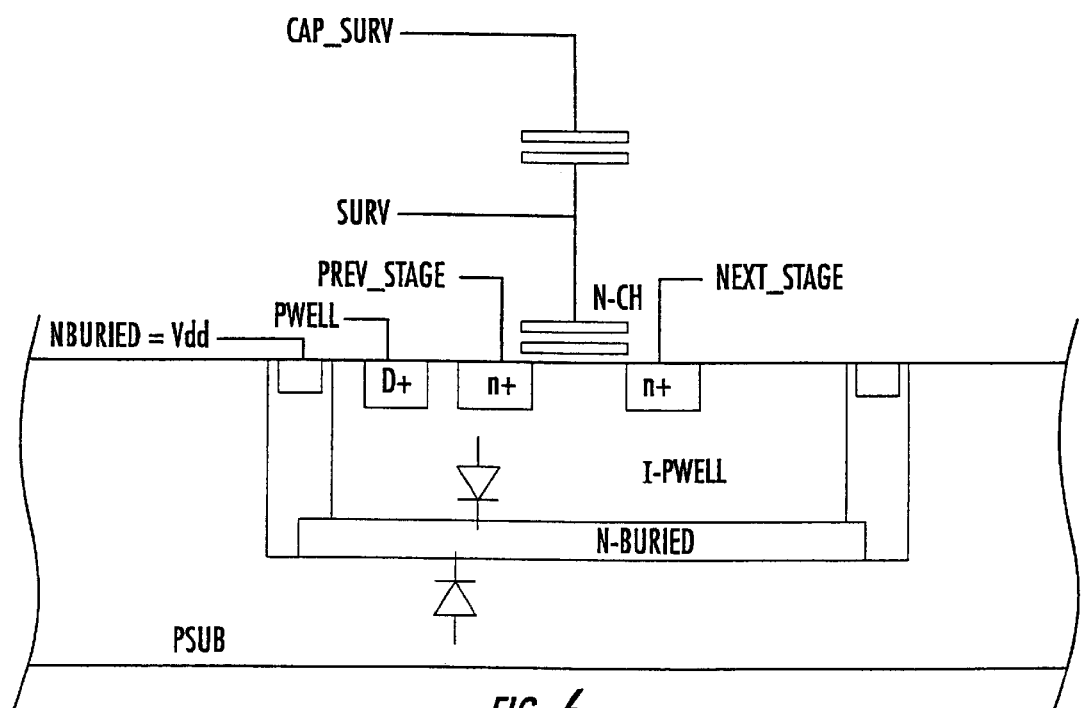
FIG. 6 is a schematic cross-sectional view, on enlarged scale, of an N-Channel MOS transistor incorporated into a stage of the negative charge pump architecture according to the present invention.

With reference to the drawing views, in particular to the example of FIG. 4, reference numeral 1 globally and schematically denotes a negative charge pump circuit realized according to the present invention. More specifically, but not exclusively, the inventive circuit 1 may be validly used during the writing and erasing phases of memory cells. The following description is done with reference to this specific field of application just for clarity of explanation and should not be considered as limiting thereof.

For memory cells means a plurality of memory elements incorporated into a conventional semiconductor integrated electronic memory device comprising a matrix of those cells structured in rows and columns. Corresponding row and column decoder portions are associated with the memory matrix, as well as a reading or sense amplifier.

The memory cells may be of any kind. More specifically, however, non-volatile memory cells are preferred because of their specific characteristic to retain the information content even if the memory device is not electrically supplied. After this brief explanation, we will disclose hereinafter in greater detail the structure and behavior of the inventive circuit 1.

Figure 1:
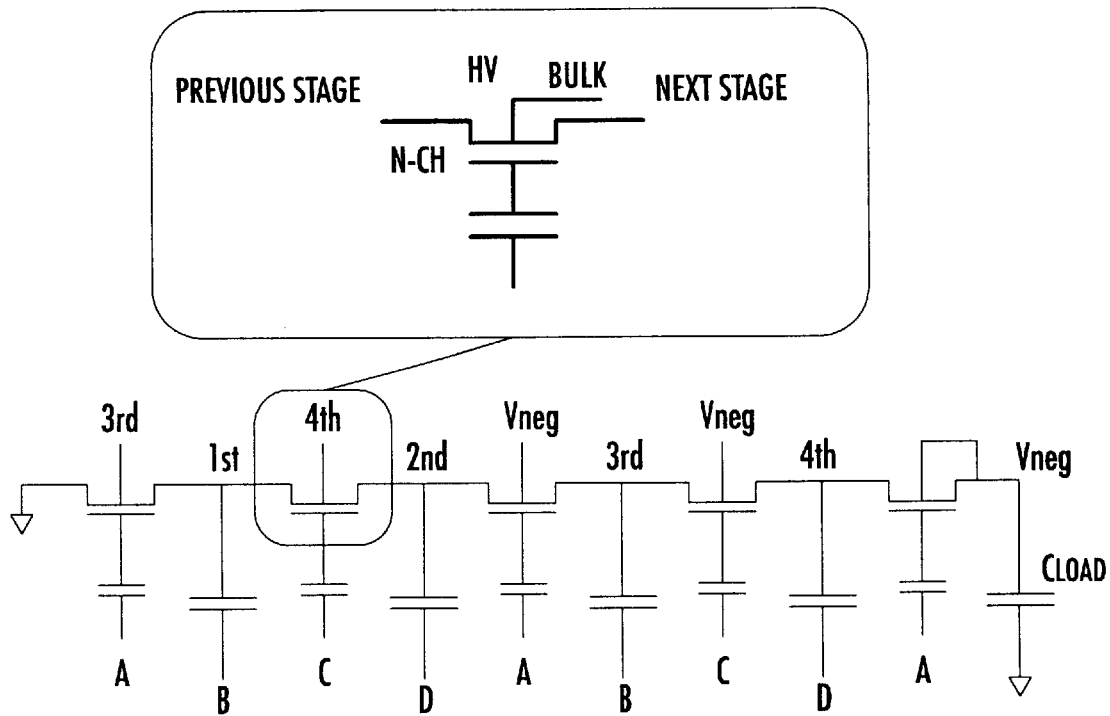
FIG. 1 is a schematic diagram of a negative charge pump architecture according to the prior art.

The circuit 1 according to the invention has been modified as compared to a common charge pump circuit like the one shown in FIG. 1. This kind of circuit comprises a plurality of stages cascade connected one after the other and each including at least one pass transistor and a charge capacitance.

The first transistor of the series has a conduction terminal connected to a supply voltage reference, for instance a ground reference GND. The other conduction terminal of the first transistor is connected to the conduction terminal of a second pass transistor and so on in a cascade connection.

The driving terminal of each pass transistor receives a driving signal through a decoupling capacitor. The first transistor receives a signal AA, while the second transistor of the series receives a different signal CC in phase opposition as compared to the previous one. The odd transistors: first, third, fifth, etc, all receive the signal AA, while the even transistors: second, fourth, sixth, etc., all receive the signal CC.

Since the charge pump disclosed here is a negative type, the output of the charge pump circuit 1 will be an output terminal producing a negative voltage value Vneg as compared to ground potential. Such an output terminal is connected to ground through a charge capacitor Cload. The output stage may be identified by the bulk terminal of the corresponding pass transistor being connected to the driving terminal.

Advantageously, the circuit 1 is modified as compared to the known circuits in the following respects. First, a further capacitance 2 has been added to the to the first charge pump stage (1st). This further capacitance is connected in parallel to the classic or conventional charge capacitance. In this manner the circuit is enabled to receive a higher charge quantity from both sides of the pump.

Second, a further output stage 3 has been associated with the first stage of the charge pump. Accordingly, the charge pump according to the present invention presents a double output stage—one at the end of the cascade connection of the pump stages, and the other located near the first stage ($1^{st}$) and connected downstream directly to the first stage.

These features present independent advantages and they may be included independently one from the other in the inventive charge pump, although these may also be used together in combination in some embodiments of the charge pump circuit 1.

The further output stage 3 is driven by the signal CC, since it is connected downstream to the first stage driven by the signal AA. Advantageously, the negative potential −Vdd is pumped or increased and picked up from the output terminal of the output stage 3 and it is used as a second supply for a pair of inverters 4, 5 that are also fed by the positive reference supply voltage Vdd.

The input of the first inverter 4 receives a signal A_N and produces the signal AA to be applied to the odd stages. The input of the second inverter 5 receives a signal C_N and produces the signal CC to be applied to the even stages.

In substance, the further or second output stage 3 allows generating a negative supply voltage to feed the inverters 4 and 5 that are the drivers of the driving phases of the charge pump circuit 1. Thus, the invention suggests picking up a negative voltage generated by the charge pump itself and using this negative voltage to feed the inverters 4 and 5 thereby generating the driving phases for all the pass transistors.

Figure 2:
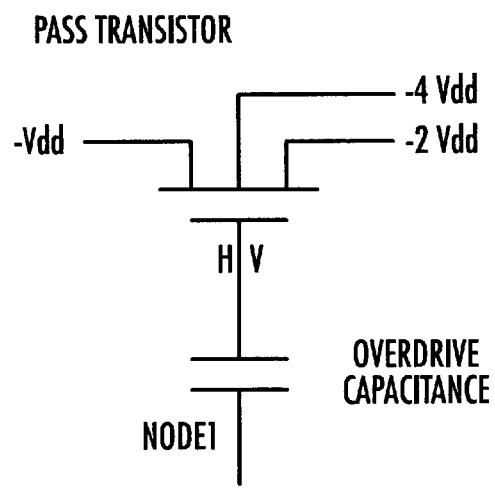
FIG. 2 is a schematic diagram of a pass transistor incorporated in a charge pump architecture according to the prior art.
Figure 3A:
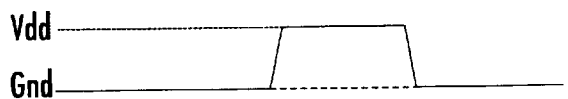
FIG. 3A is a schematic plot of the pattern of one of the phases used for the charge transfer in the charge pump architecture of the prior art.
Figure 3B:
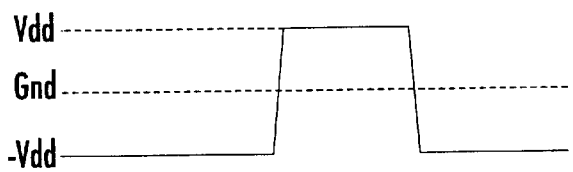
FIG. 3B is a schematic plot of the pattern of one of the phases used for the charge transfer in the negative charge pump architecture of the present invention.

For example, using the voltage values previously indicated, each inverter 4, 5 is supplied by the voltage values Vdd and −Vdd and provides a phase (AA, CC) having a voltage swing corresponding to 2*Vdd instead of a single supply voltage value Vdd as in node 1 of FIG. 2 on the driving terminal of a pass transistor.

Figure 7:
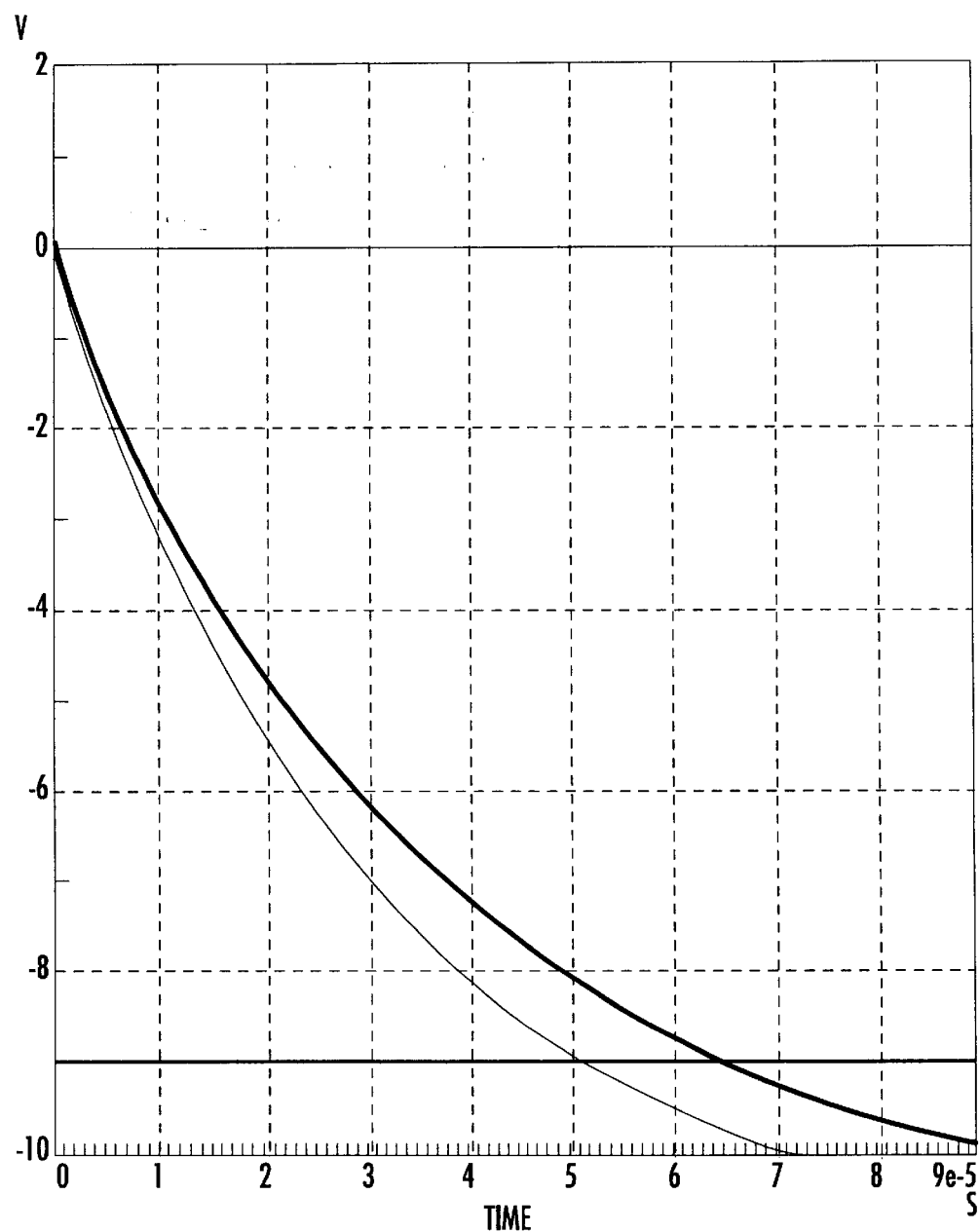
FIG. 7 is a comparative plot of voltage vs. time showing the pattern of a pumped signal produced by the inventive charge pump circuit and by a known charge pump circuit, respectively.
Figure 8A:
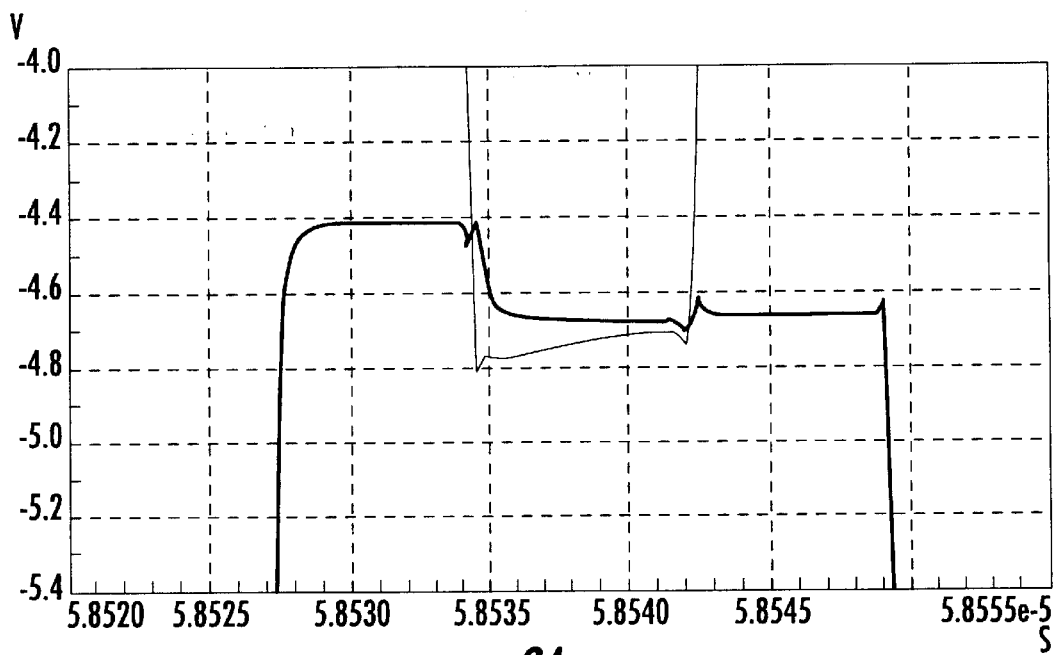
FIG. 8 is a comparative plot of voltage vs. time showing the pattern of signals produced by the inventive charge pump circuit and by the known charge pump circuit of FIG. 1, respectively.
Figure 8B:
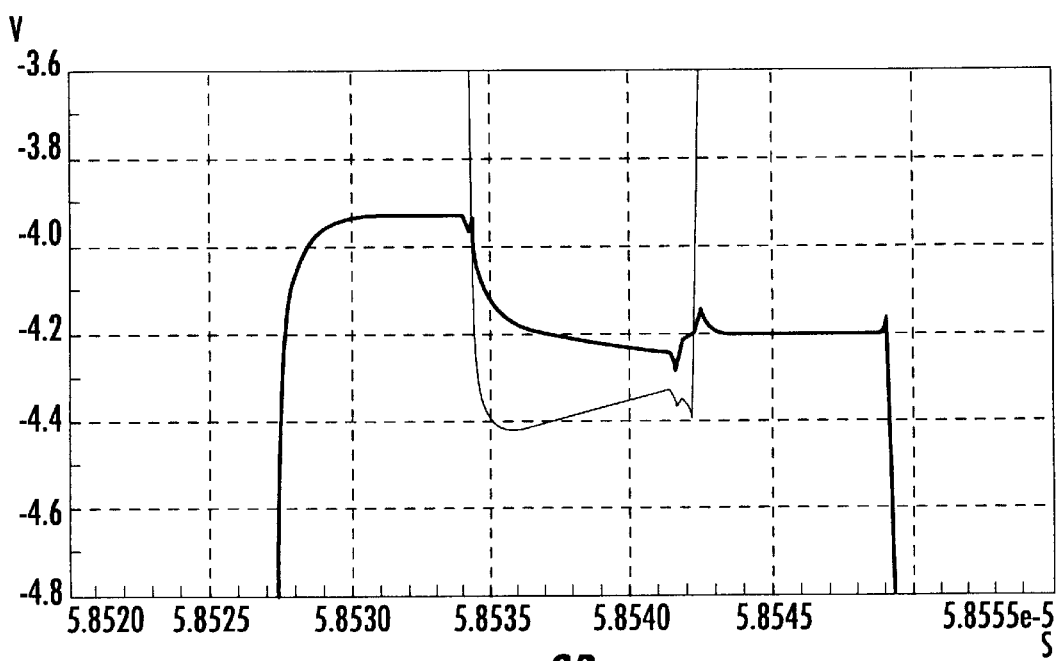

This simple approach allows improving the performance of a negative charge pump circuit. More particularly, the better performance is shown in the enclosed figures in terms of reduction of the so-called setting time Trise, that changes in the Vdd=2V case, from a setting time of 66 μs to 52 μs. The diagram in FIG. 7 illustrates this improvement. The better performance is also in terms of improvement in the charge transfer between the pump stages passing from an imperfect closure between the stages in the prior art circuit (as shown in FIG. 8B) to a complete charge transfer in accordance with the circuit of the invention as seen in the diagram of FIG. 8A with Tclock=30 ns.

Figure 9A:
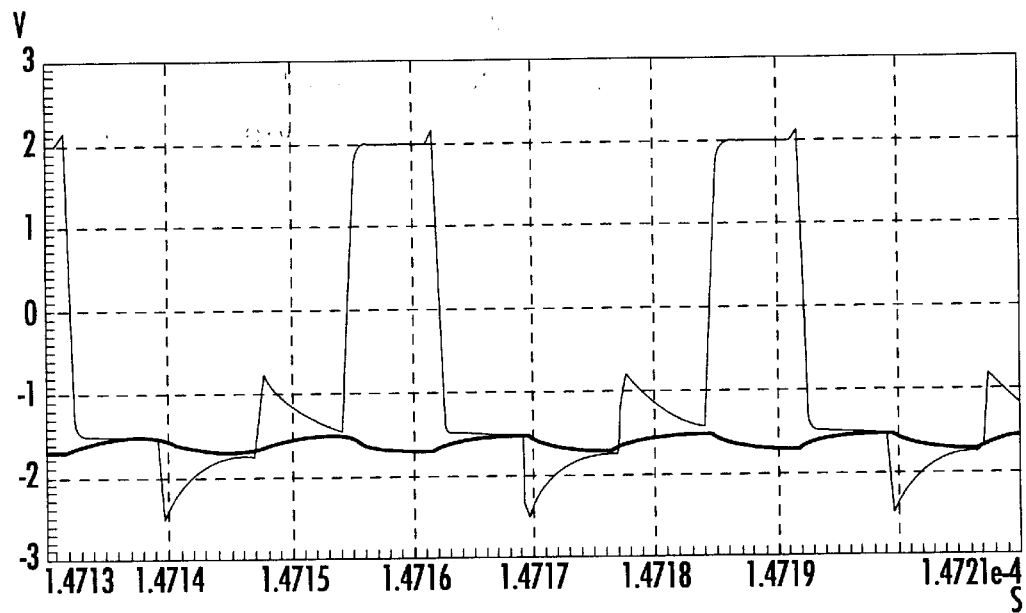
FIG. 9 is a comparative plot of voltage vs. time showing the pattern of further signals produced by the inventive charge pump circuit and by the known charge pump circuit of FIG. 1, respectively.
Figure 9B:
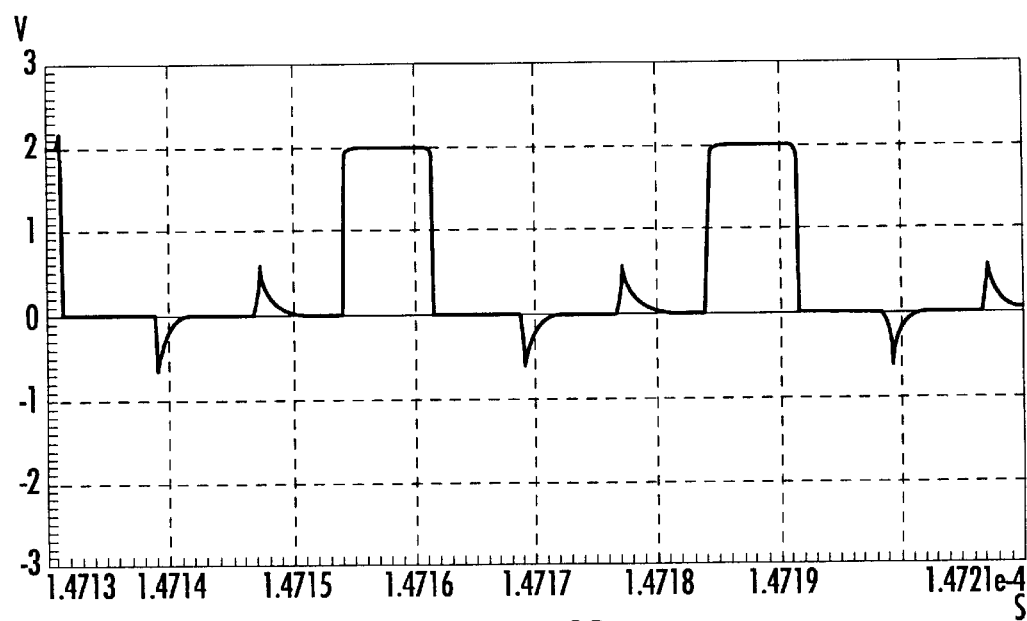

FIGS. 9A and 9B are comparative voltage vs. time diagrams showing the pattern of the phase voltages produced by the inventive charge pump circuit 1 (FIG. 9A) and by the known charge pump circuit of FIG. 1 (FIG. 9B). The different voltage swing of the normal phases (Vdd) and the pumped phases (2Vdd) can be noted. The inventive circuit provides many advantages, perhaps the most important of which is that the pumped phases allow suppling the stages wiht phase signals generated internal to the charge pump circuit.

That which is claimed is:

1. A negative charge pump circuit comprising:
   a plurality of stages cascade connected to one another and comprising a first input stage, a first output stage, and at least one other stage connected therebetween, the first input stage connected to an input reference voltage, the first output stage including a first terminal on which a first pumped voltage is generated compared to the input reference voltage;
   each stage including at least one pass transistor driven by a corresponding phase signal, a capacitance connected to said at least one pass transistor, and a decoupling capacitor connected to a control terminal of the pass transistor and receiving the phase signal;
   a second output stage connected downstream from said first input stage and including a second terminal on which is generated a second pumped voltage; and
   first and second inverters, connected to the second terminal for generating phase signals for the pass transistors of said plurality of stages.

2. A negative charge pump circuit according to claim 1, wherein the input reference voltage is ground.

3. A negative charge pump circuit according to claim 1, further comprising an additional capacitance connected in parallel with the capacitance of the first input stage.

4. A negative charge pump circuit according to claim 1, wherein said second output stage further comprises a pass transistor; and wherein odd pass transistors of said plurality of stages are driven by a same phase signal driving the pass transistor of the second output stage.

5. A negative charge pump circuit according to claim 1, wherein each of said inverters is supplied by first and second supply voltages; and wherein the first supply voltage is provided by the second terminal of said second output stage.

6. A negative charge pump circuit according to claim 5, wherein the second supply voltage is a positive supply voltage.

7. A negative charge pump circuit according to claim 6, wherein the second pumped voltage is equal in absolute value to two times the positive supply voltage.

8. A negative charge pump circuit according to claim 1, wherein the first inverter provides driving phase signals for even stages and the second inverter provides driving phase signals for odd stages.

9. A charge pump circuit comprising:
   a plurality of stages cascade connected to one another and comprising a first input stage, a first output stage, and at least one other stage connected therebetween, the first input stage connected to an input reference voltage, the first output stage including a first terminal on which a first pumped voltage is generated;
   each stage including at least one pass transistor driven by a corresponding phase signal, and a capacitance connected to said at least one pass transistor;
   an additional capacitance connected in parallel with the capacitance of the first input stage;
   a second output stage connected downstream from said first input stage and including a second terminal on which is generated a second pumped voltage; and
   first and second inverters, connected to the second terminal, for generating phase signals for the pass transistors of said plurality of stages.

10. A charge pump circuit according to claim 9, wherein the first inverter provides driving phase signals for even stages and the second inverter provides driving phase signals for odd stages.

11. A charge pump circuit according to claim 9, wherein said second output stage further comprises a pass transistor; and wherein odd pass transistors of said plurality of stages are driven by a sane phase signal driving the pass transistor of the second output stage.

12. A charge pump circuit according to claim 11, wherein each of said inverters is supplied by first and second supply voltages; and wherein the first supply voltage is provided by the second terminal of said second output stage.

13. A charge pump circuit according to claim 12, wherein the second supply voltage is a positive supply voltage.

14. A charge pump circuit according to claim 13, wherein the second pumped voltage is equal in absolute value to two times the positive supply voltage.

15. A charge pump circuit according to claim 9, wherein the input reference voltage is ground.

16. A charge pump circuit according to claim 9, wherein each stage further comprises a decoupling capacitor connected to a control terminal of the pass transistor and receiving the phase control signal.

17. A charge pump circuit comprising:
   a plurality of stages cascade connected to one another and comprising a first input stage, a first output stage, and at least one other stage connected therebetween, the first input stage connected to an input reference voltage, the first output stage including a first terminal on which a first pumped voltage is generated;

each stage including at least one pass transistor driven by a corresponding phase signal, and a capacitance connected to said at least one pass transistor;

a second output stage connected downstream from said first input stage and including a second terminal on which is generated a second pumped voltage; and first and second inverters, connected to the second terminal, for generating phase signals for the pass transistors of said plurality of stages.

18. A charge pump circuit according to claim 17, wherein each of said inverters is supplied by first and second supply voltages; and wherein the first supply voltage is provided by the second terminal of said second output stage.

19. A charge pump circuit according to claim 18, wherein the second supply voltage is a positive supply voltage.

20. A charge pump circuit according to claim 17, wherein the first inverter provides driving phase signals for even stages and the second inverter provides driving phase signals for odd stages.

21. A method for providing at least one pumped voltage from a charge pump circuit comprising a plurality of stages cascade connected to one another and comprising a first input stage, a first output stage, and at least one other stage connected therebetween, each stage including at least one pass transistor driven by a corresponding phase signal and a capacitance connected to the at least one pass transistor, the method comprising:

supplying an input reference voltage to the first input stage and generating a first pumped voltage from the first output stage;

coupling a second output stage downstream from the first input stage for generating a second pumped voltage; and generating phase signals for the pass transistors using first and second inverters connected to the second pumped voltage.

22. A method according to claim 21, further comprising supplying to each inverter first and second supply voltages; and wherein the first supply voltage is provided the second pumped voltage.

23. A method according to claim 22, wherein the second supply voltage is a positive supply voltage.

24. A method according to claim 21, wherein the first inverter provides driving phase signals for even stages and the second inverter provides driving phase signals for odd stages.

* * * * *

UNITED STATES PATENT AND TRADEMARK OFFICE
CERTIFICATE OF CORRECTION

PATENT NO.     : 6,720,822 B2                                       Page 1 of 1
DATED          : April 13, 2004
INVENTOR(S)    : Davide Torrisi and Ignazio Martines It is certified that error appears in the above-identified patent and that said Letters Patent is hereby corrected as shown below:

Column 4,
Line 33, delete "added to the to the first" insert -- added to the first --

Column 5,
Line 34, delete "wiht" insert -- with --

Column 6,
Line 42, delete "sane" insert -- same --

Signed and Sealed this

Fifteenth Day of June, 2004

JON W. DUDAS
*Acting Director of the United States Patent and Trademark Office*